United States Patent [19]

Hoeptner, III

[11] Patent Number: 4,935,128

[45] Date of Patent: Jun. 19, 1990

[54] MOTORCYCLE ENGINE LUBRICATING OIL FILTER APPARATUS

[75] Inventor: Herbert W. Hoeptner, III, San Luis Obispo, Calif.

[73] Assignee: Custom Chrome, Inc., Morgan Hill, Calif.

[21] Appl. No.: 202,466

[22] Filed: Jun. 6, 1988

[51] Int. Cl.⁵ ...................... B01D 27/10; B01D 35/14
[52] U.S. Cl. ...................... 210/130; 210/136; 210/168; 210/430; 210/484; 210/497.01
[58] Field of Search ............... 210/130, 133, 136, 168, 210/416.1, 416.5, 429, 430, 451, 452, 454, 484, 485, 497.01

[56] References Cited

U.S. PATENT DOCUMENTS

| 3,295,680 | 1/1967 | Wilber | 210/130 |
| 3,853,763 | 12/1974 | Hall | 210/130 |
| 4,126,553 | 11/1978 | Berg | 210/130 |
| 4,246,109 | 1/1981 | Manders | 210/130 |
| 4,401,563 | 8/1983 | Koelfgen | 210/130 |

Primary Examiner—Richard V. Fisher
Assistant Examiner—Wanda L. Millard
Attorney, Agent, or Firm—William W. Haefliger

[57] ABSTRACT

An oil filtering apparatus includes a check valve at the bottom of and within a cylindrical porous filter unit, to pass oil directly into an oil tank in case of clogging of the filter unit or cartridge. Channeling in the check valve inverted cap by-passes flow around the valve within the cap, when the valve is depressed; and a well formed around the cap collects dirt and other particles, within the filter unit lower interior.

11 Claims, 2 Drawing Sheets

MOTORCYCLE ENGINE LUBRICATING OIL FILTER APPARATUS

BACKGROUND OF THE INVENTION

This invention relates generally to filtering of motorcycle engine lubricating oil; and more particularly concerns a highly advantageous filter unit employed in series with the engine oil circulation system.

Filters employed in the past for filtering engine crankcase oil have included pressure relief devices that require a relatively large 0-ring to move readily and stretch on a conical surface to uncover a relief port; however, the 0-ring is subject to malfunction, and sediment can clog and cake at interstices between the ring and cone. These difficulties are enhanced due to the fact that the 0-ring is normally at a high level, above the main extent of the filter, and thus not lubricated by oil standing in a tank that receives the filter; also, the 0-ring and cone decrease substantially the overall filtering length of the filter unit, so that the unit needs more frequent replacement than would be the case if the 0-ring and conical wall were not used. There is need for an improved filter that avoids these difficulties.

SUMMARY OF THE INVENTION

It is a major object of the invention to provide a solution to the above problems and difficulties. The oil filtering apparatus of the invention is adapted to be used in a motorcycle oil tank having an upper inlet opening for the filter unit, and an annular lip bounding that opening to support the unit. The apparatus includes:

(a) a generally cylindrical filter unit having an upright shell which is sidewardly perforated along its length, the unit including filter media adjacent the inner side of the shell, (b) an annular flange on the shell at its upper end adapted to engage a seal supported by said lip, for supporting the filter unit when said shell is received downwardly into the tank, via said inlet opening, whereby oil flowing downwardly into the filter unit normally passes laterally through said media and then through the perforated shell, into the tank outside said unit, whereby sediment in the oil is trapped by said media, (c) the unit including a bottom wall, and a check valve carried by said bottom wall to extend within the filter unit and to pass oil from the interior of the unit to the exterior of the unit via an outlet at said bottom wall, in the event of sufficient oil pressure build-up within said unit due to sediment clogging of said filter media.

As will appear, the filter unit projects downwardly into the sump oil in the tank and in such manner that the sump oil is received into a receptacle housing the check valve, and lubricates the valve and an associated spring. The receptacle is inverted and has a side wall and a top wall defining a port for escape of oil in the filter unit; the check valve is protectively located within the receptacle along with the spring; and the spring urges the valve against the underside of the receptacle top wall, to control the port.

It is another object of the invention to provide a well, i.e. sediment trap, radially between the receptacle side wall and said media, to collect sediment within the filter unit below the level of said check valve. In this regard, the filter media typically comprises a cylindrical unit defining a bore surrounding open interior space into which the inverted receptacle and check valve project, so as not to limit the overall length of the media, whereby maximum media length and filtering capacity are achieved.

These and other objects and advantages of the invention, as well as the details of an illustrative embodiment, will be more fully understood from the following specification and drawings, in which:

DRAWING DESCRIPTION

DETAILED DESCRIPTION

Figure 1:
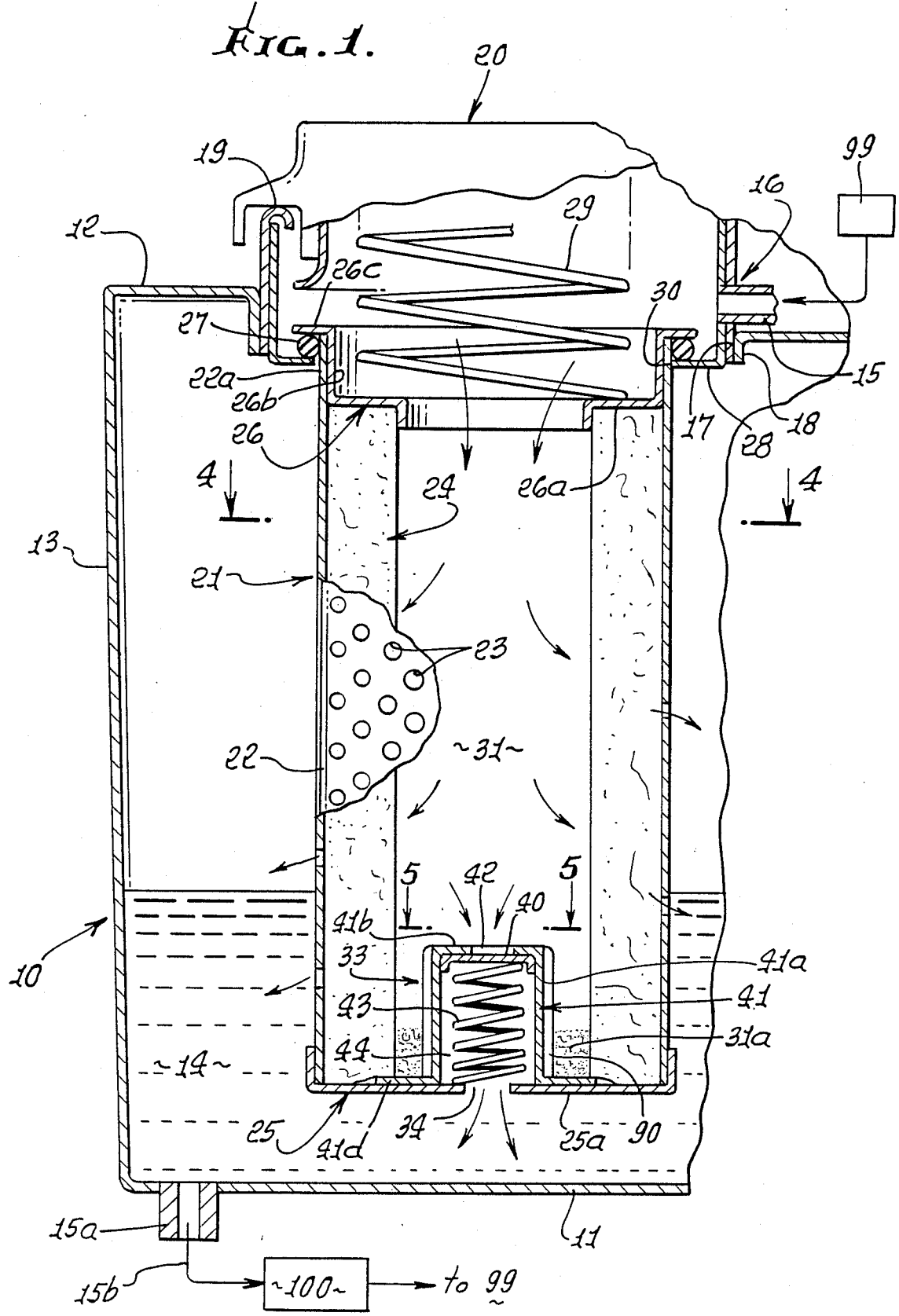
FIG. 1 is a vertical section through apparatus incorporating the invention.
Figure 2:
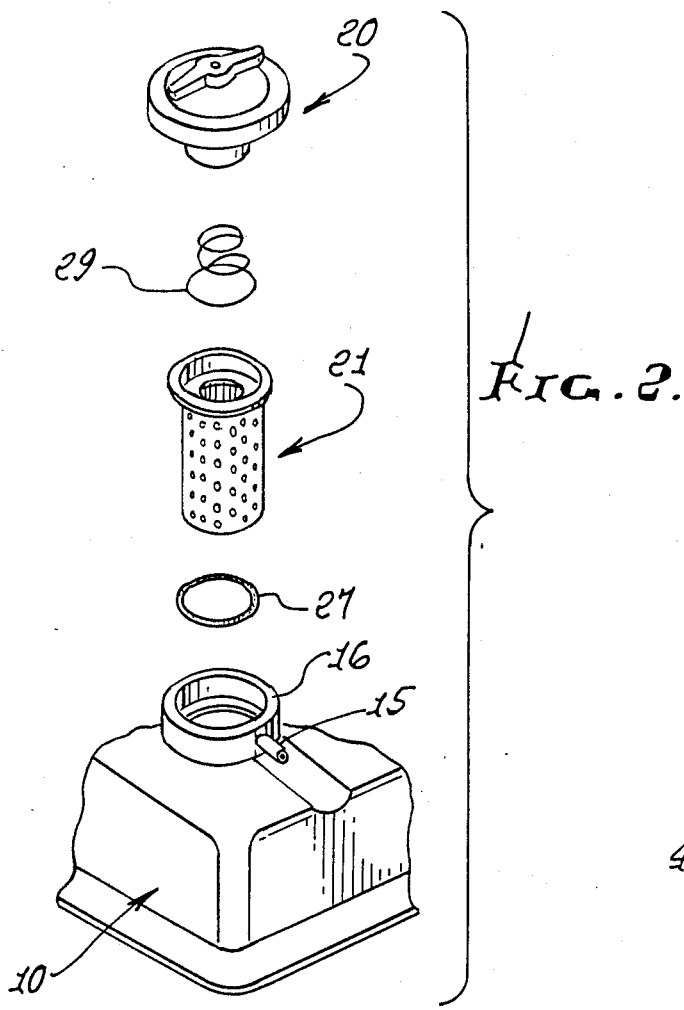
FIG. 2 is an exploded view showing components.

In the drawings, an engine oil tank 10 has bottom, top and side walls 11–13, and contains engine oil in sump or bath 14. Oil is delivered to the tank via line 15 connected to an inlet fitting 16 attached at 17 to the tank down-turned wall 18. Such oil is pumped at 99 via line 15 as from the engine crankcase. An outlet 15a at the tank bottom returns oil via line 15b to the engine, indicated at 100. The top of the fitting 16 is beaded at 19, and a cap 20 fits onto the fitting 16 as shown, and is known.

Figure 4:
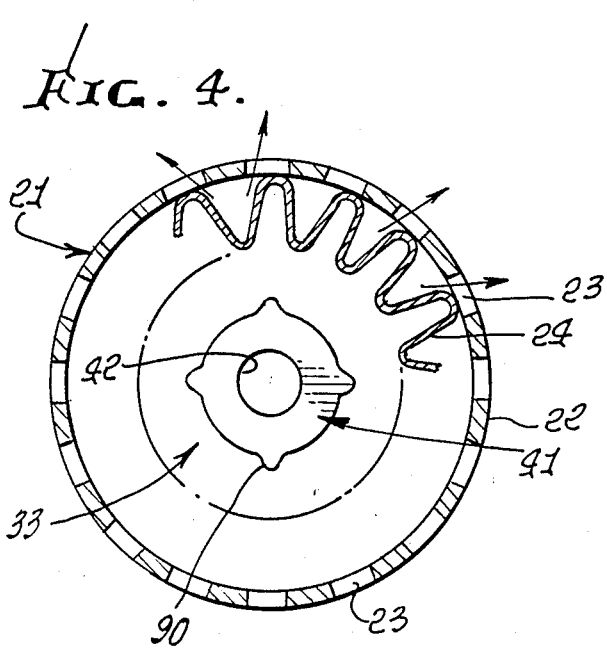
FIG. 4 is a horizontal section taken on lines 4—4 of FIG. 1.
Figure 5:
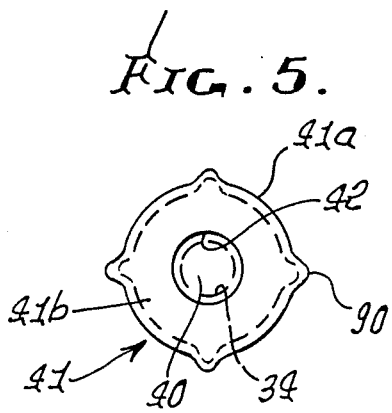
FIG. 5 is a plan view on lines 5—5 of FIG. 1.

A filter unit 21 is received downwardly into the tank, and includes a vertical cylindrical shell 22 which contains through perforations 23 about its circumference and along almost its entire vertical length, for maximum out-flow of filtered oil. The unit 21 contains filter media 24 which also extends nearly the full length of the shell, as shown, for maximum filtering effect. That media may consist of a corrugation of porous fibrous material, such as paper, seen in FIG. 4.

The media extends upwardly from the bottom cap 25 to the wall 26a of top cap 26 of the filter unit. Cap 26 also has a cylindrical side wall 26b fitting against the inner side of the uppermost extent 22a of the shell, to position the cap 26, and an annular flange 26c on the cap (and thus also on the shell) engages an O-ring seal 27, compressing it downwardly on lip 28 of fitting 16, to seal the filter unit to that fitting. A compression spring 29 fits between the cap 20 and the wall 26a, to yieldably urge the cap 26 and flange 26c thereof downwardly as referred to, thereby positioning the filter unit in the tank. Note that the unit 10 is easily dropped down into the tank via inlet opening 30 formed by the circular inner edge of the lip 28.

Oil flowing downwardly into the interior 31 of the filter unit normally flows laterally through the pleats of the filter media 24, and then passes outwardly through the perforations 23 in shell 22, which may be metallic. Impurities in the oil are trapped by the filter media; and larger sediment strained from the oil drops to the bottom of the interior 31, i.e. into annular region 31a, and into the bottoms of the regions 32 between the pleats (see FIG. 4).

In accordance with an important aspect of the invention, a safety check valve 33 is carried by annular wall 25a of the lower cap 25, above an outlet opening 34 in that wall 25a. The check valve serves to pass oil from interior 31 above the level of sediment region 31a to the exterior of unit 10, via outlet 34, in the event of sufficient oil pressure build-up within interior 31 due to sediment or impurity clogging of the filter unit below cap 26. Such clogging is minimized due to filter media extent throughout the length of the unit 10 between lower and upper caps 25 and 26; however, by-passing of oil to the exterior is enabled via the check valve. The latter is lubricated by the oil in the sump and entering the port 34 to extend upwardly into the check valve, ensuring against malfunction.

More specifically, the check valve includes a disc 40 located within an inverted receptacle 41 carried by the cap bottom wall 25a. The receptacle has a downwardly side wall 41a, and a top wall 41b defining an inlet port 42, and the disc 40 is located immediately below port 42 to normally close same by engagement with wall 41b surrounding that port. A compression spring 43 located within the receptacle is endwise confined between wall 25a and disc 40 to yieldably urge it upwardly. The spring compression is set so that it begins downward collapse (to open the check valve) when pressure build-up in the filter unit interior 31 reaches the pre-determined threshold value.

Figure 3:
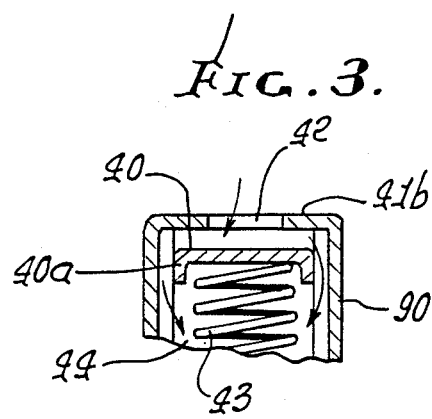
FIG. 3 is a fragmentary view showing opening of the check valve seen in FIG. 1.

Note that due to vertical side ducts 90 in side guide wall 41a, when the disc 40 is depressed, oil can flow around and over the disc periphery, down through ducts 90 that open inwardly, and downwardly in the receptacle interior 44 to lubricate the spring and disc flange 40a, and prevent malfunction as for example "hang-up" due to frictional engagement with particles between the spring or flange, and the receptacle side wall. See FIG. 3. Such particles, however, tend to flush downwardly and outwardly, due to the construction. Sediment at 31a does not interfere with check valve operation.

Caps 25 and 26 are metallic, and O-ring 27 is elastomeric. Valve 33 is also metallic, and cup-shaped, to be centered by spring 43.

Bottom annular wall 41d of the receptacle 41 is sealingly attached to the cap 25 and bottom wall 25a.

I claim:

1. In oil filtering apparatus to be used in a motorcycle oil tank having an upper inlet opening and an annular lip bounding said opening, the subcombination that comprises
   (a) a generally cylindrical filter unit having an upright shell which is sidewardly perforated along its length, the unit including filter media adjacent the inner side of the shell,
   (b) an annular flange on the shell at its upper end adapted to engage a seal supported by said lip, for supporting the filter unit when said shell is received downwardly into the tank, via said inlet opening, whereby oil flowing downwardly into the filter unit normally passes laterally through said media and then through said perforated shell, into the tank outside said unit, whereby sediment in the oil is trapped by said media,
   (c) said unit including a bottom wall, and a check valve carried by said bottom wall to extend within the filter unit and to pass oil from the interior of said unit to the exterior of said unit via an outlet at said bottom wall in the event of sufficient oil pressure build-up within said unit due to sediment clogging of said filter media,
   (d) the filter media defining an inner wall, and including an inverted receptacle comprising top and side walls attached to said unit bottom wall, and spaced from said media inner wall to define a sediment trap space, and the check valve located in the receptacle generally above the level of said sediment trap space, the receptacle top wall defining a port controlled by the check valve, the bottom wall attached to the shell defining a pressure relief outlet port, below the check valve.

2. The combination of claim 1 including said tank containing oil in a sump in the tank, the filter unit projecting downwardly into oil in the sump so that sump oil lubricates the check valve.

3. The combination of claim 2 including a cap in said tank, and extending over said upper inlet opening, and a spring between the cap and a shoulder defined by the filter unit to urge said unit downwardly for holding said flange against said seal.

4. The combination of claim 3 including an oil pump having a discharge outlet, and a duct between said outlet and said cap to pass oil under pressure to said filter unit.

5. The combination of claim 1 including a compression spring located within the receptacle and yieldably urging the check valve toward said inlet port.

6. The combination of claim 5 wherein said receptacle side wall opens in a downward direction.

7. The combination of claim 1 wherein the filter media is generally annular and extends between bottom and top walls attached to the shell, the media defining a bore surrounding an open interior, the check valve extending within the said open interior of the filter media, immediately above said bottom wall.

8. In oil filtering apparatus to be used in a motorcycle oil tank having an upper inlet opening and an annular lip bounding said opening, the subcombination that comprises
   (a) a generally cylindrical filter unit having an upright shell which is sidewardly perforated along its length, the unit including filter media adjacent the inner side of the shell,
   (b) an annular flange on the shell at its upper end adapted to engage a seal supported by said lip, for supporting the filter unit when said shell is received downwardly into the tank, via said inlet opening, whereby oil flowing downwardly into the filter unit normally passes laterally through said media and then through said perforated shell, into the tank outside said unit, whereby sediment in the oil is trapped by said media,
   (c) said unit including a bottom wall, and a check valve carried by said bottom wall to extend within the filter unit and to pass oil from the interior of said unit to the exterior of said unit via an outlet at said bottom wall in the event of sufficient oil pressure build-up within said unit due to sediment clogging of said filter media,
   (d) and including a receptacle carried by said bottom wall which opens downwardly, the receptable having a side wall and a top wall defining an inlet port, and a compression spring located within the receptacle and yieldably urging the check valve toward said inlet port, said receptacle side wall opening in a downward direction,
   (e) and including a well formed radially between said receptacle side wall and said media, to collect sediment within the filter unit below the level of said check valve.

9. In oil filtering apparatus to be used in a motorcycle oil tank having an upper inlet opening and an annular lip bounding said opening, the subcombination that comprises (a) a generally cylindrical filter unit having an upright shell which is sidewardly perforated along its length, the unit including filter media adjacent the inner side of the shell, (b) an annular flange on the shell at its upper end adapted to engage a seal supported by said lip, for supporting the filter unit when said shell is received downwardly into the tank, via said inlet opening, whereby oil flowing downwardly into the filter unit normally passes laterally through said media and then through said perforated shell, into the tank outside said unit, whereby sediment in the oil is trapped by said media, (c) said unit including a bottom wall, and a check valve carried by said bottom wall to extend within the filter unit and to pass oil from the interior of said unit to the exterior of said unit via an outlet at said bottom wall in the event of sufficient oil pressure build-up within said unit due to sediment clogging of said filter media, (d) and including a receptacle carried by said bottom wall which opens downwardly, the receptacle having a side wall and a top wall defining an inlet port, and a compression spring located within the receptacle and yieldably urging the check valve toward said inlet port, (e) and wherein the check valve comprises a cup which is inverted and carried at the upper end of the compression spring, within the receptacle.

10. In oil filtering apparatus to be used in a motorcycle oil tank having an upper inlet opening and an annular lip bounding said opening, the subcombination that comprises (a) a generally cylindrical filter unit having an upright shell which is sidewardly perforated along its length, the unit including filter media adjacent the inner side of the shell, (b) an annular flange on the shell at its upper end adapted to engage a seal supported by said lip, for supporting the filter unit when said shell is received downwardly into the tank, via said inlet opening, whereby oil flowing downwardly into the filter unit normally passes laterally through said media and then through said perforated shell, into the tank outside said unit, whereby sediment in the oil is trapped by said media, (c) said unit including a bottom wall, and a check valve carried by said bottom wall to extend within the filter unit and to pass oil from the interior of said unit to the exterior of said unit via an outlet at said bottom wall in the event of sufficient oil pressure build-up within said unit due to sediment clogging of said filter media, (d) the filter media being generally annular and extending between bottom and top walls attached to the shell, the media defining a bore surrounding an open interior, the check valve extending within the said open interior of the filter media, immediately above said bottom wall, (e) and including an inverted receptacle attached to said bottom wall, and spaced from said media bore to define a sediment trap space, and the check valve located in the receptacle generally above the level of said sediment trap space, the receptacle having a top wall defining a port controlled by the check valve, the bottom wall attached to the shell defining a pressure relief outlet port, below the receptacle.

11. The combination of claim 10 wherein the check valve slidably fits within a bore defined by the receptacle, the receptacle having upright ducts at its side to by-pass oil around the check valve when the check valve is depressed away from said top wall port by excess pressure in the filter unit above said port.

* * * * *